US012377011B2

(12) United States Patent
Kriman et al.

(10) Patent No.: US 12,377,011 B2
(45) Date of Patent: Aug. 5, 2025

(54) STAIR ASCENDING AND DESCENDING AID DEVICE WITH FLEXIBLE TENSION ELEMENTS

(71) Applicants: Alexander Kriman, Nesher (IL); Boris Kriman, Freeport (BS); Vladimir Kriman, Haifa (IL)

(72) Inventors: Alexander Kriman, Nesher (IL); Boris Kriman, Freeport (BS); Vladimir Kriman, Haifa (IL)

(*) Notice: Subject to any disclaimer, the term of this patent is extended or adjusted under 35 U.S.C. 154(b) by 0 days.

(21) Appl. No.: 18/921,268

(22) Filed: Oct. 21, 2024

(65) Prior Publication Data

US 2025/0041147 A1 Feb. 6, 2025

(51) Int. Cl.
*A61H 3/00* (2006.01)

(52) U.S. Cl.
CPC ......... *A61H 3/00* (2013.01); *A61H 2003/001* (2013.01)

(58) Field of Classification Search
CPC ............................ A61H 3/00; A61H 2003/001
See application file for complete search history.

(56) References Cited

U.S. PATENT DOCUMENTS

| | | | | | |
|---|---|---|---|---|---|
| 2,097,376 | A * | 10/1937 | Marshman | A63B 21/0004 482/124 |
| 2,782,796 | A * | 2/1957 | Margaret | A61H 3/02 135/65 |
| 4,113,161 | A * | 9/1978 | Manuszak | A45C 13/26 108/14 |
| 5,131,494 | A * | 7/1992 | Heifetz | A61H 3/00 182/113 |
| 5,318,057 | A * | 6/1994 | Wallum | A61H 3/02 135/65 |
| 5,865,203 | A * | 2/1999 | Villano | A61H 3/00 135/65 |
| 8,348,868 | B1 * | 1/2013 | Severence | A61H 1/0262 601/34 |
| D845,012 | S * | 4/2019 | Thomas | D6/349 |

* cited by examiner

*Primary Examiner* — Noah Chandler Hawk

(57) ABSTRACT

The invention relates to a stair ascending and descending aid device designed to assist individuals with limited mobility. The device includes a foot platform with a height less than that of a standard stair step and a set of flexible tension elements connecting the foot platform to the user's upper body. These tension elements may include elastic components and can be held by hand or attached to the body, allowing the user to move the platform from one stair step to another. The platform can either move independently of the user's foot or synchronously with it.

7 Claims, 8 Drawing Sheets

STAIR ASCENDING AND DESCENDING AID DEVICE WITH FLEXIBLE TENSION ELEMENTS

BACKGROUND

Technical Field

Ascending and descending stairs can be challenging for elderly individuals and those with limited mobility due to factors such as decreased muscle strength, poor balance, joint pain, and reduced endurance. Existing solutions have limitations, making them less practical for everyday use.

Description of the Related Art

Several devices are known to assist with ascending and descending stairs. Patents WO1996012529A1, EP0768077A1, FR2810211A1, U.S. Pat. No. 5,907,913A, and DE102019001872A1 describe various types of platforms attached to the foot using straps and fasteners. However, these solutions have several drawbacks. The user must bend down or lift their foot to attach the platform, which can be inconvenient and challenging for those with limited mobility. If the platform is worn like a slipper, it may not require the use of hands but can result in an insecure attachment, which is dangerous when moving on stairs. Similar to footwear, the platform must fit the user's foot size, requiring the production of different sizes, which increases manufacturing costs. The platform may be heavy, adding extra load to the foot. If the platform is made from lightweight, durable materials like those used in sports footwear, it increases the product's cost.

In U.S. Pat. Nos. 3,884,327A, 4,274,430, DE3005482A1, US48444199, U.S. Pat. No. 5,318,057, WO9934761A1, and JP2010162304A, cane-based solutions with a platform approximately half the height of a stair step are proposed. These solutions also have several drawbacks. When moving on flat surfaces, the user may not need a cane, as pain and discomfort primarily arise when ascending or descending stairs. However, the use of a cane in these devices makes them bulky and inconvenient for everyday use. Walking on flat surfaces with a cane that has a platform attached to the end is inconvenient and difficult. When the cane is tilted at an angle, the weight of the platform generates a significant torque, which tends to twist the cane in the user's hand, making it challenging to control and use effectively. If the platform is detached from the cane and only attached when needed for stair use, the user must spend time attaching it each time, which can be inconvenient and inefficient. The need for mechanisms to attach the platform to the cane complicates the design of the device and increases its cost. The proposed invention addresses these drawbacks and aims to create a convenient, portable, compact, and cost-effective device for ascending and descending stairs.

SUMMARY

The proposed device comprises a foot platform and a set of flexible tension elements connecting the foot platform to the user's upper body, such as the hands, shoulders, torso, or neck. These flexible tension elements may include elastic components.

In one preferred embodiment, the platform is designed so that when it is lifted and carried using a flexible tension member, the almost inevitable rotation of the freely hanging platform does not affect the user's ability to place it in the desired location. This is achieved by symmetrically designing the platform and attaching the flexible tension member at the geometric center of its upper surface. In another preferred embodiment, the platform is fixed on the user's foot due to the tension of the elastic flexible tension members and the resulting frictional force between the sole of the foot and the platform.

Additional features include a control handle, a neck or shoulder strap for load distribution, flexible elastic tubes to soften the impact of the foot platform on the steps of the stairs, smaller diameter holes in the upper platform panels for securing elastic cords, and other enhancements.

DETAILED DESCRIPTION OF THE PREFERRED EMBODIMENTS

Figure 1:
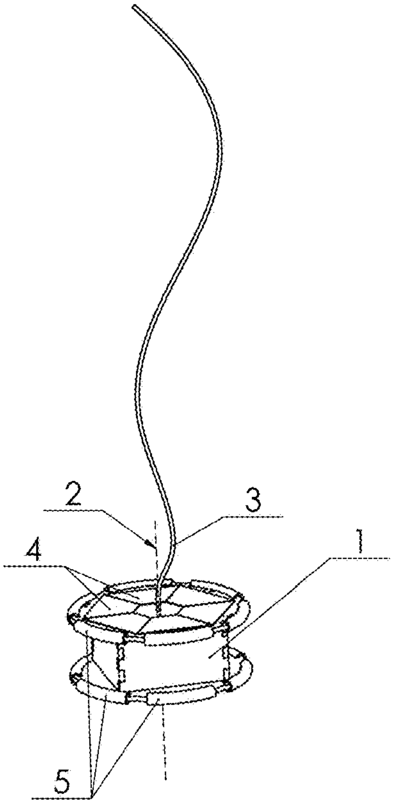
FIG. 1 is a perspective view of an axially symmetrical foot platform with a cord attached to the center of its top panel.

A first preferred embodiment of the invention is shown on FIG. 1. The height of platform 1 is approximately half the height of a stair step. The platform 1 has a symmetry axis 2. A flexible tension element 3 is attached to the center of the upper surface of the platform. The other end of the flexible tension element is held by the user. Non-slip pads 4 are attached to the upper panel of platform 1. Elastic tubular elements 5 are secured around the perimeter of the platform to soften possible impacts with other hard surfaces.

Figure 2:
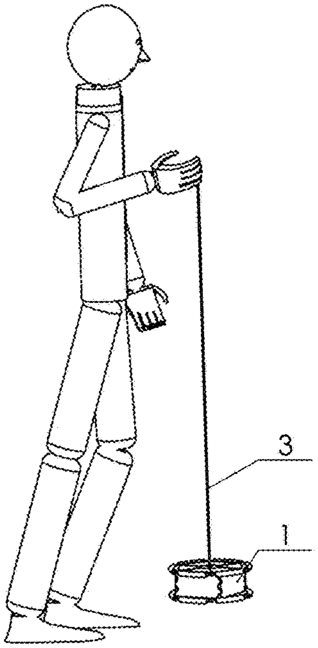
FIG. 2 is a perspective view of a user holding the foot platform by one end of the flexible tension element.
Figure 3:
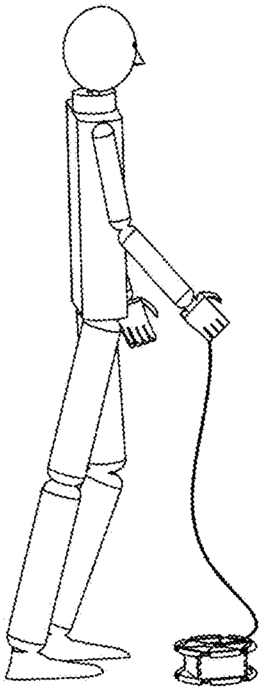
FIG. 3 is a perspective view of a user lowering the foot platform to the floor.

The user lifts the platform by holding one end of the flexible tension element, as shown in FIG. 2, and places it on any horizontal surface, as shown in FIG. 3. The platform, suspended on the flexible tension element in FIG. 2, can rotate around axis 2, which the user may find difficult to control. However, the symmetrical shape of the platform and the central attachment of the flexible tension element make this rotation non-critical, as it does not prevent the user from placing the platform in the desired location.

Figure 4:
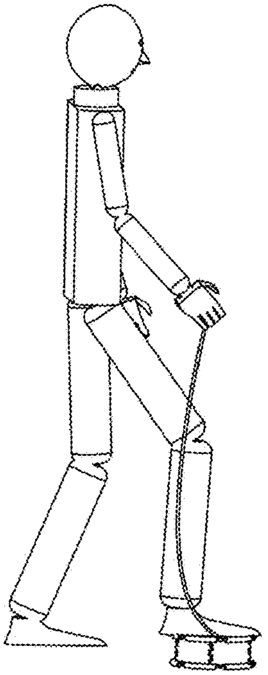
FIG. 4 is a perspective view of a user stepping on the foot platform.

After moving the platform, the user slightly lowers the hand holding the free end of the flexible tension element, reducing the tension, and steps onto the platform. The flexible tension element 3 bends and partially remains under the user's foot, as shown in FIG. 4.

The user sequentially moves the platform from one stair step to another, and each time, before ascending the next stair step, steps onto the platform on the previous stair step. Each separate movement raises or lowers the user by approximately half a stair step height. This movement requires less effort than ascending the full height of a stair step, significantly reducing the load on the leg muscles and joints and bending the knee joint less than when stepping up to a stair step.

Figure 5A:
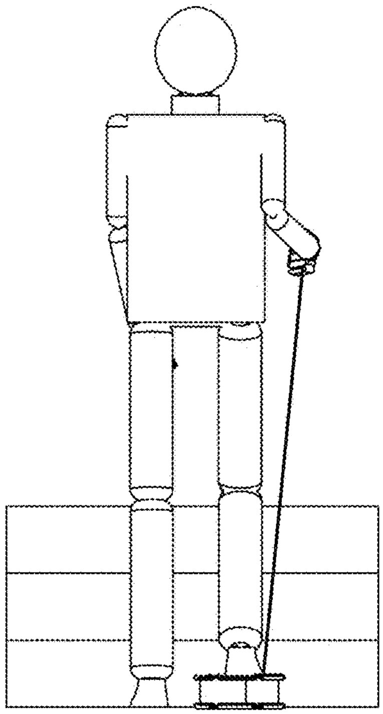
FIGS. 5A-5D is a sequence of back views of a user ascending stair using an axially symmetrical foot platform with a cord attached to the center of its top panel.
Figure 5B:
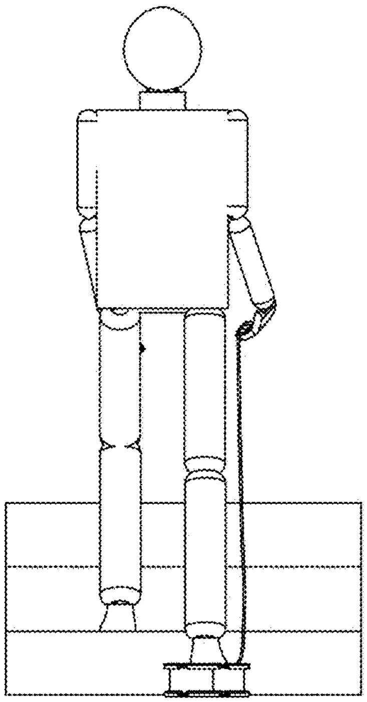
Figure 5C:
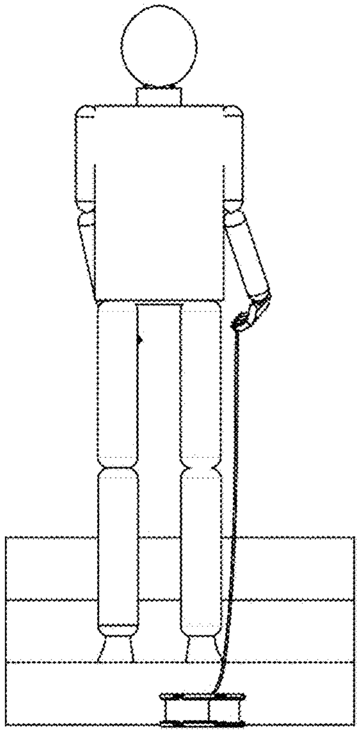
Figure 5D:
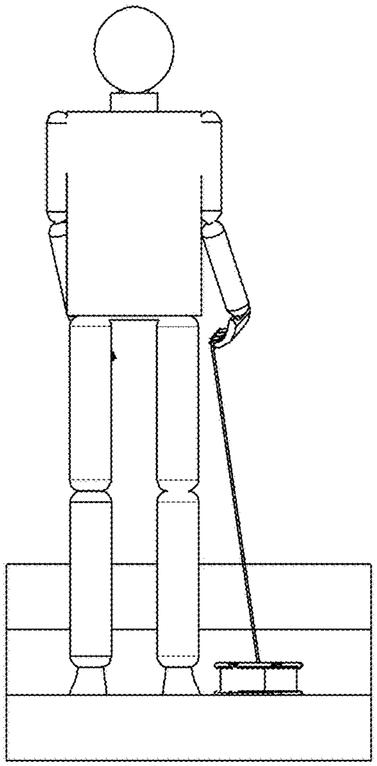

The sequence of actions when ascending stairs is shown on FIGS. 5A-5D. The user stands in front of the staircase with the right foot on the platform (FIG. 5A). The user shifts their weight onto the right foot and places the left foot on the first stair step (FIG. 5B). Then, leaning on the left foot, the user lifts the right foot and places it on the first step of the stairs (FIG. 5C). Standing with both feet on the first stair step, the user moves the platform to the first stair step (FIG. 5D). From this position, the user places the right foot on the platform again and repeats the cycle.

Figure 6A:
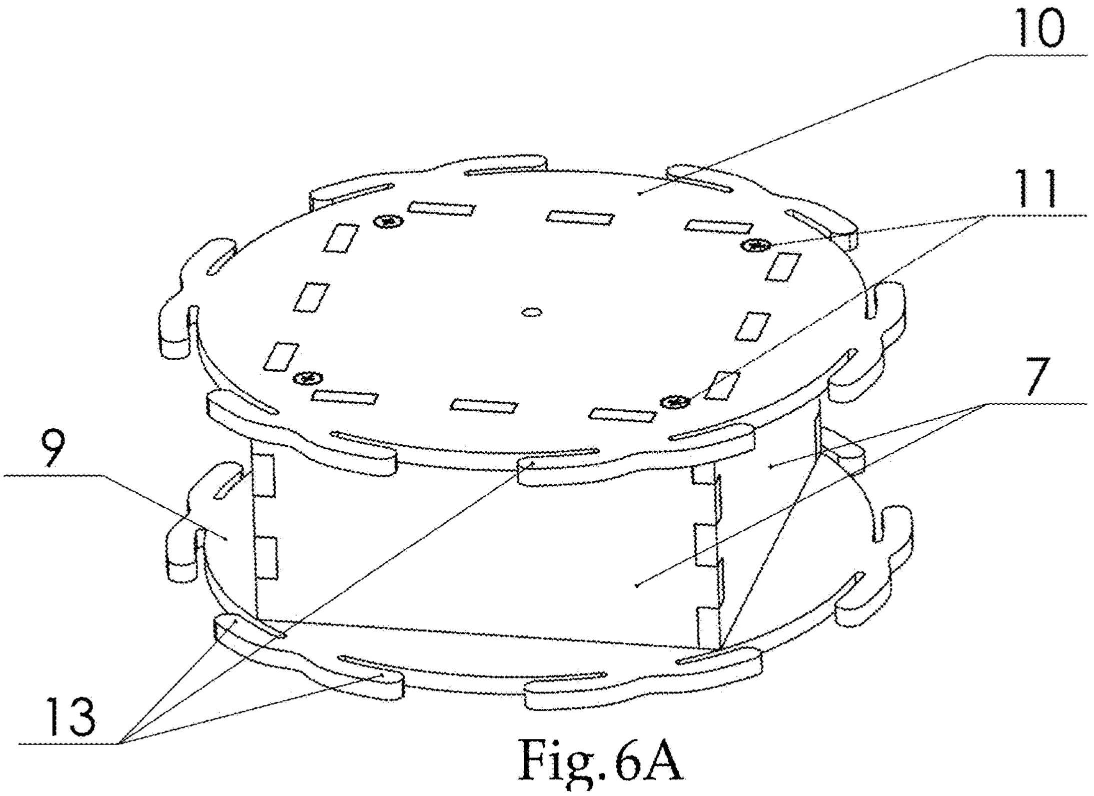
FIGS. 6A-6D is a sequence of detailed perspective views of the axially symmetrical foot platform.
Figure 6B:
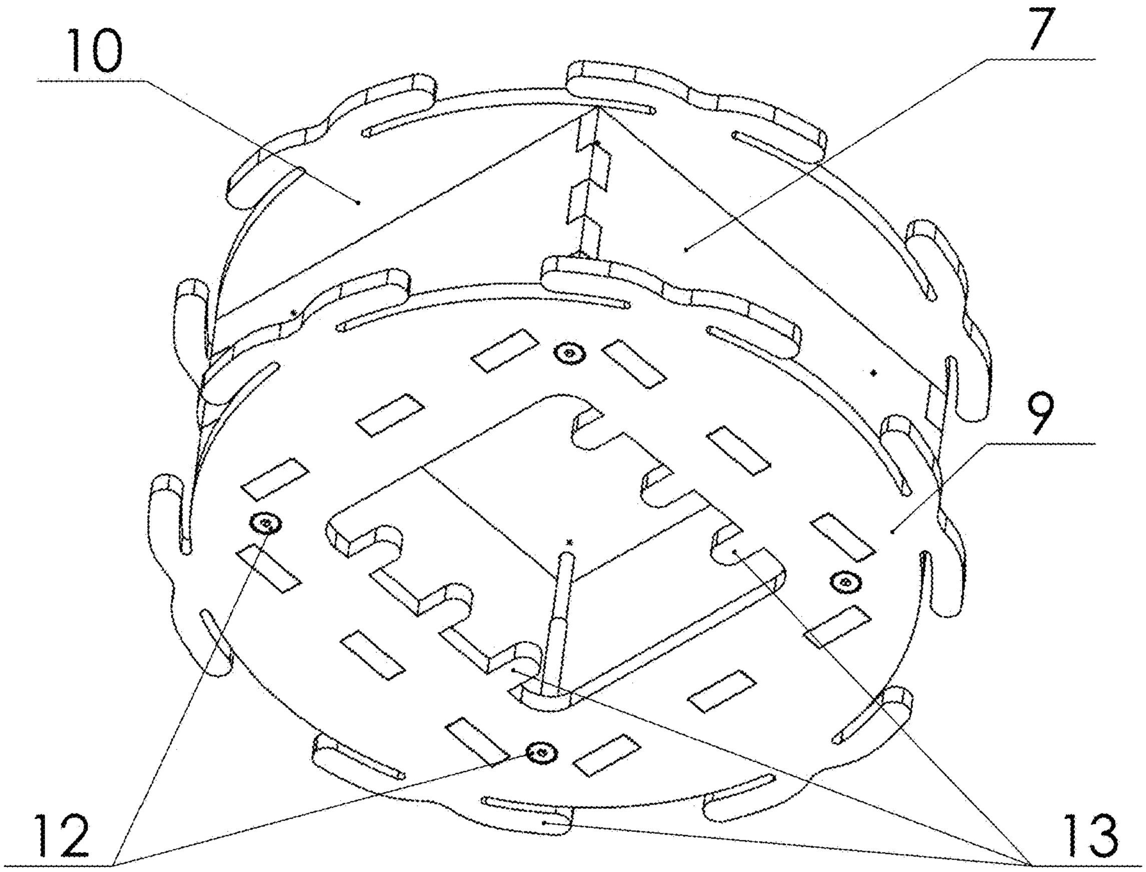
Figure 6C:
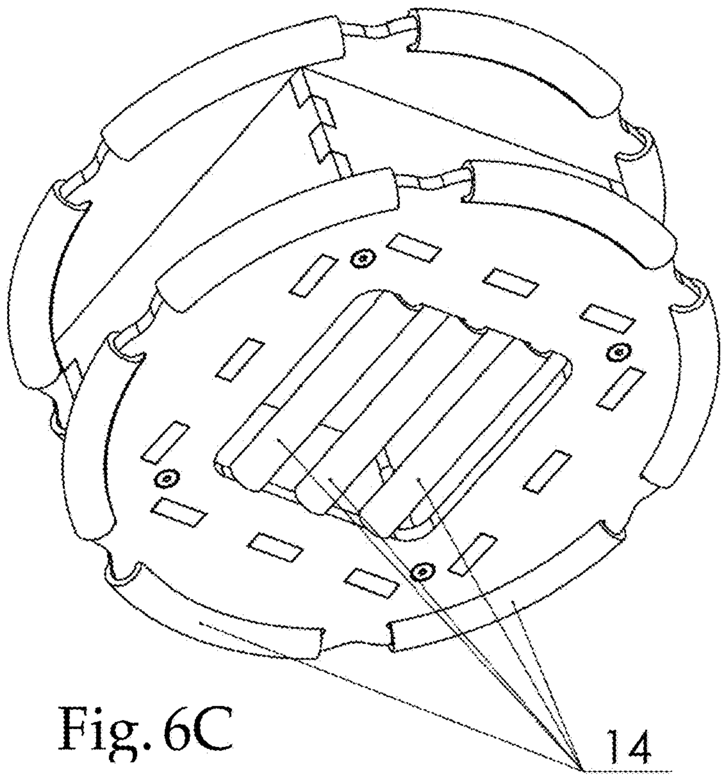
Figure 6D:
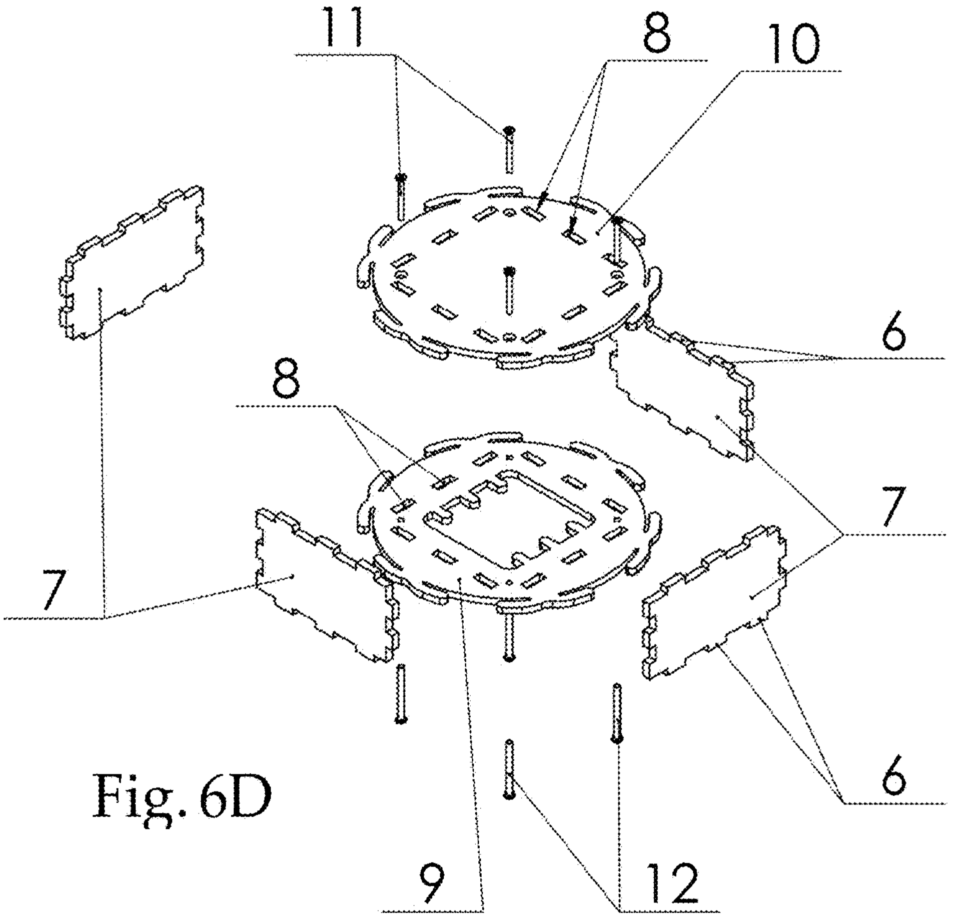

FIG. 6A shows the body of axially symmetrical foot platform 1 from above. FIG. 6B shows it from below. FIG. 6C shows the axially symmetrical foot platform 1 with protective elastic tubular elements. An exploded view of the of axially symmetrical foot platform is shown in FIG. 6D. The platform can be made from sheet material, such as plywood. The platform is assembled by inserting the tabs 6 of the sidewalls 7 into the holes 8 in the bottom 9 and upper panel 10 and securing the upper panel 10 and bottom 9 with countersunk screws 11 and Ericson nuts 12. To soften possible impacts with the vertical and horizontal surfaces of the stair steps, the upper panel 10 and bottom panel 9 are equipped with protrusions 13, onto which soft elastic tubes 14 are fitted.

In order for the user to be able to release the free end of the flexible tension element from time to time, this end is attached to the upper part of the user's body so as to prevent it from falling and relieve the user from having to bend over and lift it. By releasing the free end of the flexible tension element, the user temporarily frees his hand to place it on the railing of the stairs or on the adjacent wall. The free end of the flexible tension element is attached either by a bracelet on the wrist, or by fastening to a shoulder or neck strap, or by some other known method.

Figure 7A:
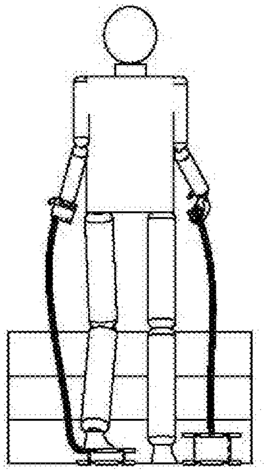
FIGS. 7A-7I is a sequence of back views of a user ascending stairs using two foot platforms, one with a height equal to one-third of the stair step height and the other with a height equal to two-thirds of the stair step height.
Figure 7B:
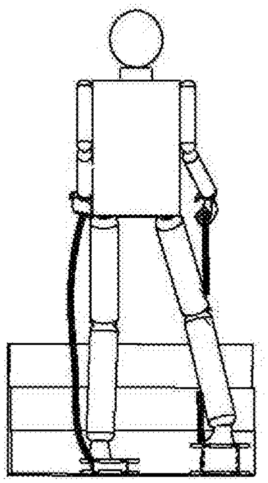
Figure 7C:
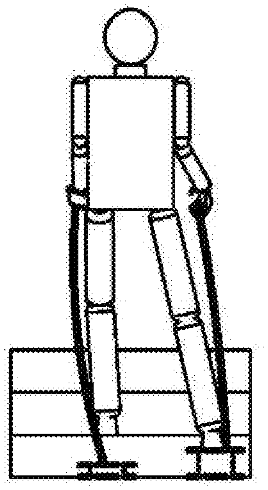
Figure 7D:
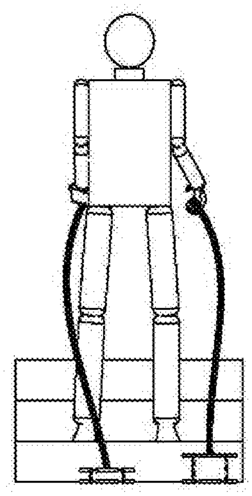
Figure 7E:
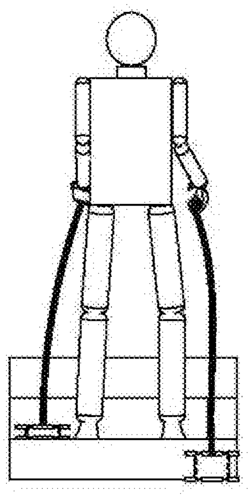
Figure 7F:
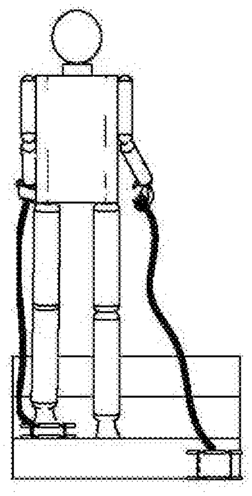
Figure 7G:
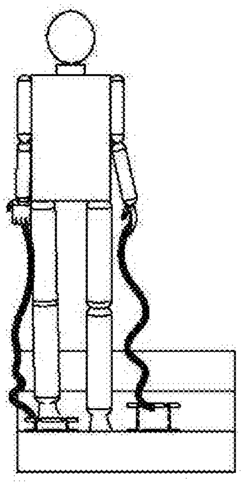
Figure 7H:
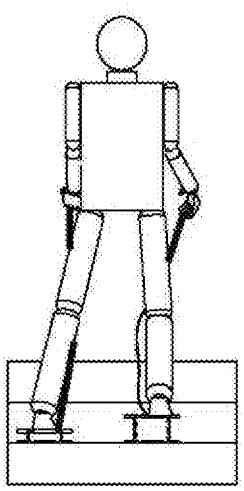
Figure 7I:
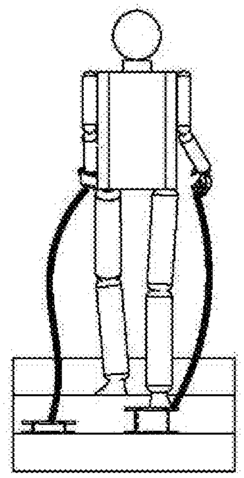

The process of ascending stairs can be further facilitated by using two platforms, one with a height equal to approximately one third of the height of the step of the stairs, and the other with a height equal to approximately two thirds of the height of the step of the stairs. By stepping alternately on a low platform, then on a high platform, and then on the next step of the stairs, the user divides the effort of climbing one step of the stairs into three steps, and each step raises the user's body only a small height equal to one third of the height of the step of the stairs. The left platform 15 (see FIG. 7A) is configured with a height equal to one-third of the height of a stair step (referred to as the "low platform"), while the right platform 16 (see FIG. 7A) is configured with a height equal to two-thirds of the height of a stair step (referred to as the "high platform"). In the initial position, the user places their left foot on the low platform 15 (see FIG. 7A). Subsequently the user shifts their weight onto the left foot and positions their right foot on the high platform 16 (see FIG. 7B). Using the right foot for support, the user then advances the left foot to the first step of the stairs (see FIG. 7C), followed by moving the right foot to the first step of the stairs (see FIG. 7D). Thus, the user has moved to the first step of the stairs. In order to start climbing to the second step of the stairs, both platforms must be moved to the first step of the stairs. Using the flexible tension member 17, the user first lifts the low platform 15 with the left hand (see FIG. 7E), steps on it with the left foot (see FIG. 7F), and then, using the flexible tension member 18, lifts the high platform 16 with the right hand and places it to the right of the right foot (see FIG. 7G). The position in FIG. 7G is similar to the position in FIG. 7A, except that in FIG. 7G the user stands on the first step of the stairs instead of the floor. Then the cycle is repeated. The user places the right foot on the high platform on the right (see FIG. 7H). The position in FIG. 7H repeats the position in FIG. 7B, but now everything is one step higher. In FIG. 7I, the user places the left foot on the second step of the stairs, repeating the position in FIG. 7C at a new height. The user climbs the stairs with minimal effort, each movement raising or lowering the user only about a third of the height of the stair step.

Figure 8A:
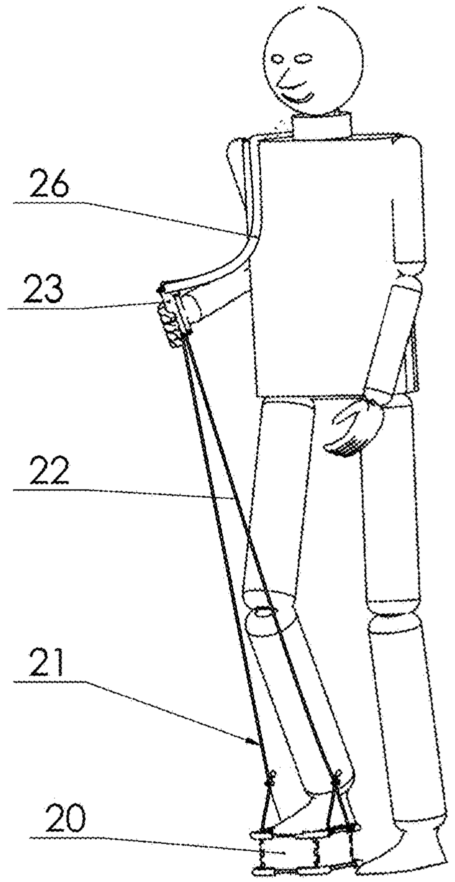
FIG. 8A is a perspective view of a user with a foot platform with elastic flexible tension elements.
Figure 8B:
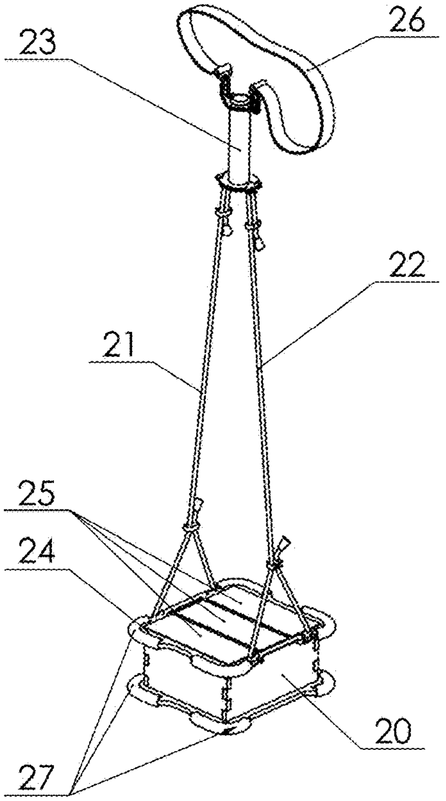
FIG. 8B is a perspective view of a foot platform with elastic flexible tension elements.

In the first preferred embodiment of the invention, the user first moves the platform and then moves his feet. In the second preferred embodiment, the foot platform is attached to one of the user's feet by means of elastic flexible tension elements (FIGS. 8A-8B) and moves synchronously with the feet. This reduces the number of steps the user needs to take when climbing or descending stairs. The rectangular platform 20 is attached to the sides with two elastic cords 21 and 22, made, for example, from rubber or silicone. Cords 21 and 22 converge and are secured to a handle 23. The length of the cords is chosen so that when the user holds the handle 23 (FIG. 8A) and their foot is on the platform 20, the elastic cords are in a stretched state. The elastic force of these cords presses the platform 20 against the user's foot. Due to this force and the anti-slip stickers 25 adhered to the upper panel 24 of the platform 20, friction is created between the foot and the upper panel of the platform, securing the foot on the platform 20. The handle 23 allows the user to slightly change the angle of the cords 21 and 22 relative to the upper panel of the platform and hold these elastic cords so that this angle is as close as possible to a right angle. In this position, the force pulling the platform 20 towards the foot and, accordingly, the friction force between the foot and the platform, are maximized, allowing the user to move their foot together with the platform as if the platform were rigidly attached to the foot. At the same time, the user barely feels the weight of the platform, as it is compensated by the elastic force of the cords, which in turn is transferred through a shoulder strap 26 to the user's shoulder. The platform 20 is not too heavy for the shoulder, and the foot on the platform and the hand holding the handle 23 feel almost no load.

Figure 9A:
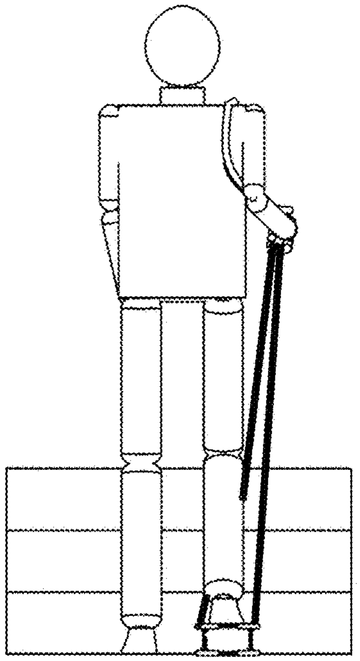
FIGS. 9A-9C is a sequence of back views of a user ascending stair using a foot platform with elastic flexible tension elements.
Figure 9B:
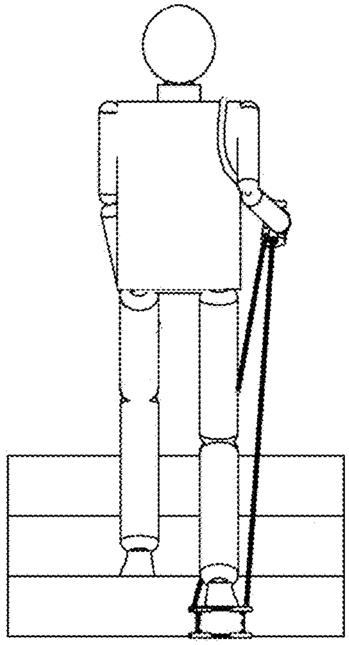

When ascending stairs with platform 20, in the initial position (FIG. 9A), the user's left foot is on the floor, and the right foot is on the platform, which is also on the floor. The user shifts their weight onto the right foot and places the left foot on the first stair step (FIG. 9B).

Figure 9C:
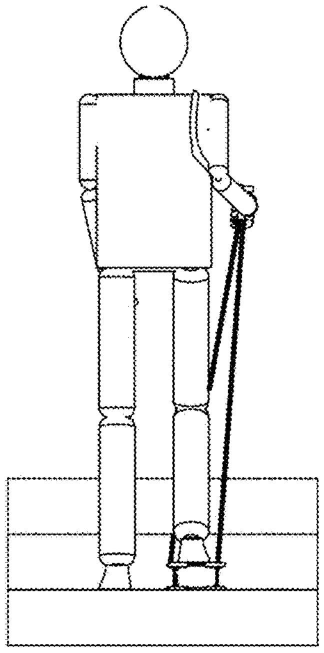

Then, concentrating their weight on the left foot, the user moves the right foot together with the platform onto the first stair step (FIG. 9C). The cycle then repeats. In this embodiment of the invention, the platform moves synchronously with the user's foot, unlike in the first embodiment, where the platform and the user's foot move asynchronously.

In other embodiments of the invention, the handle may be absent, and the elastic flexible tension elements can be directly attached to a wristband, shoulder strap, or waist belt. The essential aspect here is that the elastic flexible tension elements are stretched between the platform and any points on the user's upper body, ensuring the platform is secured to the foot.

Figure 10A:
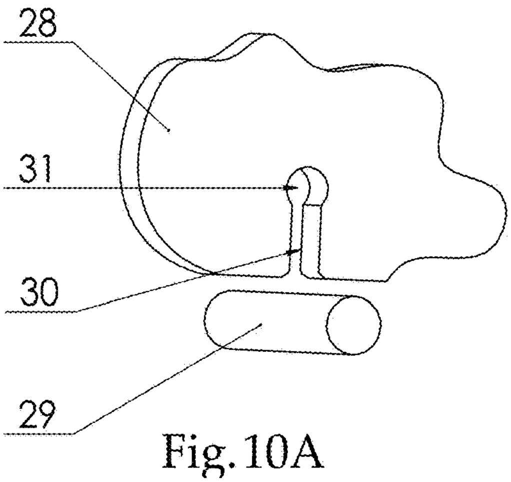
FIGS. 10A-10D is a sequence of perspective views of the steps involved in attaching an elastic cord to a plate-shaped part.
Figure 10B:
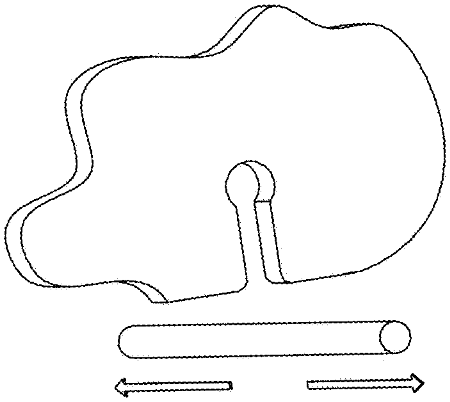
Figure 10C:
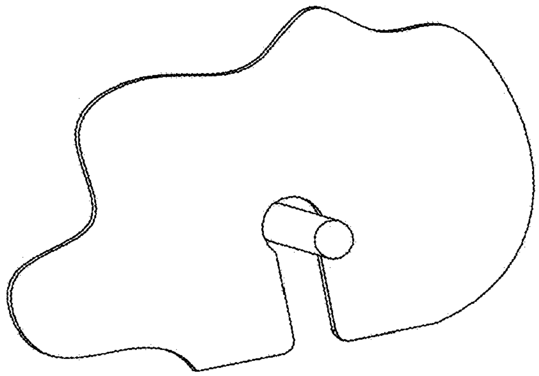
Figure 10D:
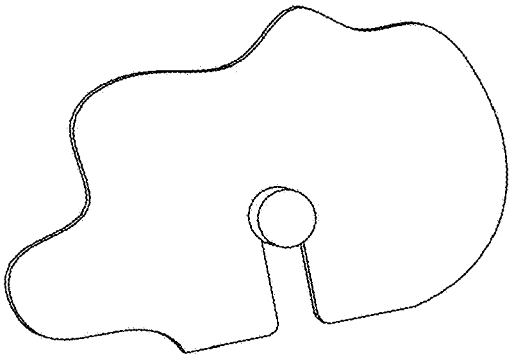

The platform 20 is also structurally made of sheet material, such as plywood. Elastic tubes 27 protect the platform 20 from impacts, similar to the tubes 14 in the first embodiment. The elastic cords 21 and 22 are attached to circular holes in the upper panel 24. The attachment principle is illustrated in FIGS. 10A-10D. The diameter of the hole in the sheet material 28 is slightly smaller than the diameter of the elastic cord 29 (FIG. 10A). When a section of the elastic cord 29 is stretched (FIG. 10B), its diameter decreases so that it can be inserted into the hole 31 through a slit 30 (FIG. 10C). When the cord's tension is released, its diameter increases again (FIG. 10D). As a result, friction occurs between the outer surface of the cord 29 and the inner surface of the hole 31 at the point of contact, securely connecting the elastic cord 29 and the corresponding sheet material part 28. In other embodiments of the invention, elastic tubes or flat elastic straps may be used as the flexible tension elements.

Figure 11A:
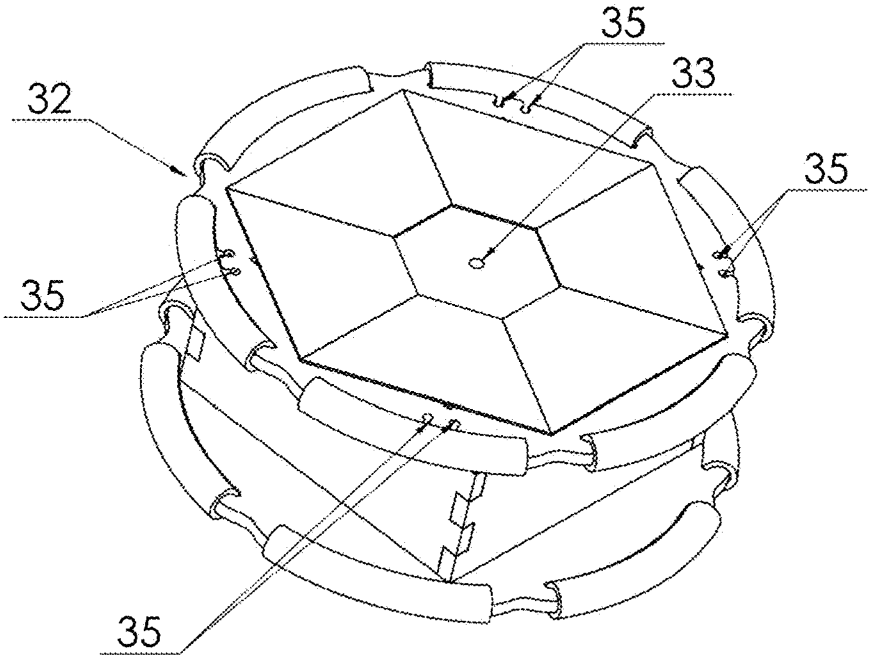
FIGS. 11A-11C are perspective views of a universal foot platform designed for use with either elastic flexible tension elements attached to the sides or a non-elastic flexible tension element attached to the center of the platform's top panel.
Figure 11B:
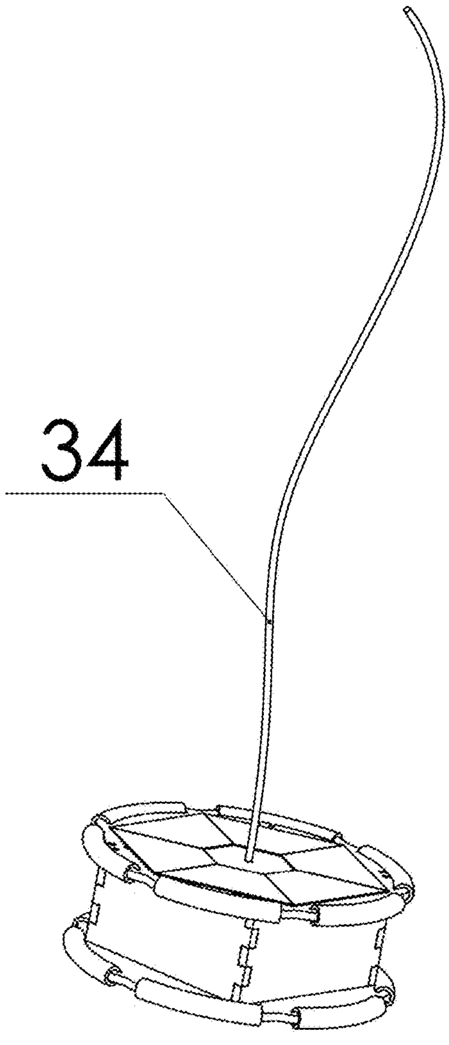
Figure 11C:
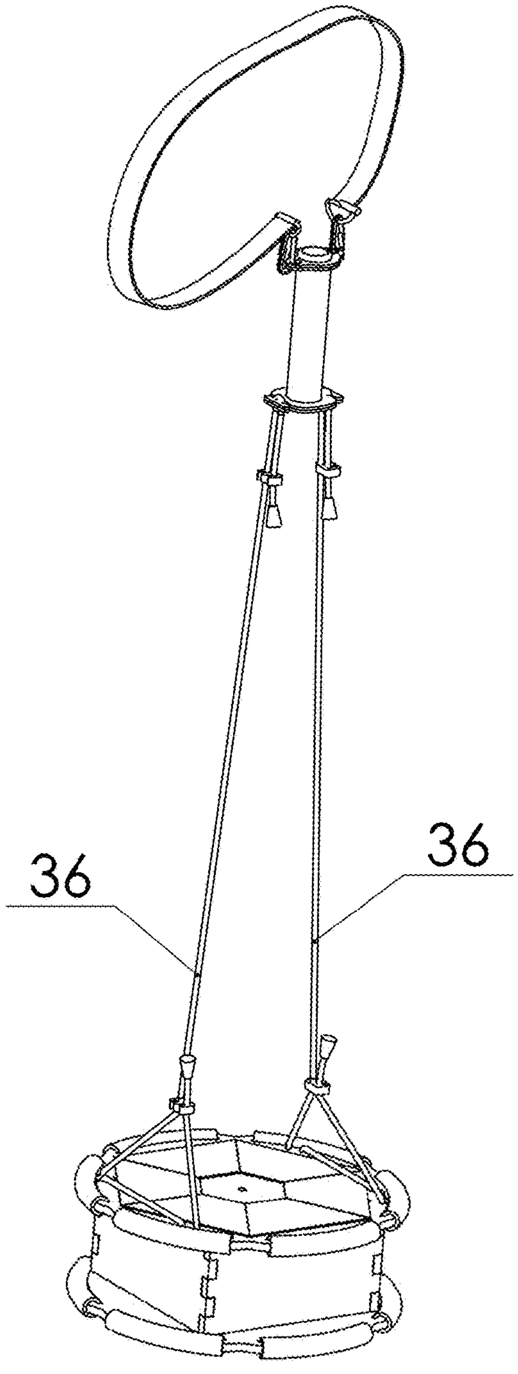

FIGS. 11A-11C show an embodiment of the invention in which the platform 32 has axial symmetry and a hole 33 in the center for attaching a cord 34, similar to the first embodiment, and holes 35 in the upper panel for attaching flexible tension elements 36, as in the second embodiment. This allows the user to use the same platform either as in the first embodiment with asynchronous movement of the foot and platform, or as in the second option with synchronous movement of the platform and one of the feet.

FIGS. 5A-5D, 7A-7I, 9A-9C illustrate the processes of ascending stairs. The same platforms can be similarly used for descending stairs. When descending, the user benefits from stepping first onto the platform and then onto the next lower stair step, reducing the height of each descent movement.

These models are simple to manufacture, compact, convenient to use, and suitable for different user groups. While certain novel features of this invention have been shown and described and are pointed out in the annexed claim, it is not intended to be limited to the details above, since it will be understood that various omissions, modifications, substitutions, and changes in the forms and details of the device illustrated and in its operation can be made by those skilled in the art without departing in any way from the spirit of the present invention.

Without further analysis, the foregoing discloses the essence of the present invention so completely that others, using current knowledge, will be able to easily adapt it to various applications without losing features that, from the point of view of prior art, fairly constitute essential characteristics of the general or specific aspects of the present invention.

REFERENCES

1. U.S. Pat. No. 3,884,327A (1975): Invalid's portable step unit and attached carrying handle member therefor.
2. U.S. Pat. No. 4,274,430A (1981): Walking cane.
3. DE3005482A1 (1981): Handicapped walker stair climbing aid-comprises half-height steps extending over part of the main step's width.
4. U.S. Pat. No. 4,844,419A (1989): Stair climbing aid.
5. U.S. Pat. No. 5,318,057A (1994): Half-step stability cane.
6. WO1996012529A1 (1996): Method and device for facilitating the climbing of stairs.
7. EP0768077A1 (1997): Assistance device for persons with impaired walking ability
8. U.S. Pat. No. 5,907,913A (1999): Device for reducing knee stress when climbing and descending stairs and method of use.
9. WO9934761A1 (1999): Walking aid.
10. FR2810211A1 (2002): Device for helping handicapped person clear staircase step.
11. JP2010162304A (2010): Walking stick with step base.
12. DE102019001872A1 (2020): Modern mobile stage.

What is claimed is:

1. A device for assisting in ascending and descending stairs, comprising:

a foot platform with a height less than that of a stair step;

a set of flexible tension elements connecting said foot platform to the user's upper body, including but not limited to the hands, shoulders, torso, and neck;

wherein the set of flexible tension elements allows user to move the platform from one stair step to another, step on one stair, then on said foot platform, and then on another stair in sequence, and thereby raise or lowers the body to a height less than the height of the stair step, wherein the flexible tension elements are configured to ensure secure placement of the said platform on stair steps, preventing overturning or shifting that could hinder or obstruct the user's movement, wherein a lower surface and optionally upper surface of the said foot platform comprise projections on which flexible elastic tubes are placed to soften the impact of the platform on the steps of the stairs.

2. The device of claim 1, wherein the said set of flexible tension elements is connected to the user's upper body through a control handle.

3. The device of claim 1, wherein the upper surface of said foot platform has a center of symmetry, and a single flexible tension member is connected to said foot platform at this center of symmetry, so that any rotation of the foot platform about a vertical axis passing through this center of symmetry does not require the user to change foot position when stepping on said foot platform.

4. The device of claim 1, wherein said set of flexible tension elements comprises elastic elements configured to maintain constant contact between the foot platform and the user's foot, enabling the platform to move in synchronization with the user's foot during ascending, descending, or any other movement.

5. The device of claim 1, wherein the said set of flexible tension elements is connected to the user's shoulder through a shoulder strap.

6. The device of claim 1, wherein said foot platform is assembled from sheet material, such as plywood or plastic, with components that are pre-cut and designed to be easily joined using protrusions, matching openings, and screws, allowing for convenient user assembly and compact packaging.

7. The device of claim 1, wherein said set of flexible tension elements comprises elements made of a round elastic cord, and wherein the said elastic cord is attached to the upper surface of the foot platform by inserting the cord into circular openings of a smaller diameter than the diameter of the cord through adjacent side cuts, enabling easy assembly, disassembly, and replacement of the tension elements by the user.

* * * * *